(12) United States Patent
Kimoto

(10) Patent No.: US 7,855,744 B2
(45) Date of Patent: Dec. 21, 2010

(54) IMAGE PICKUP APPARATUS AND A NOTIFICATION OPERATION CONTROL METHOD

(75) Inventor: Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 11/472,907

(22) Filed: Jun. 22, 2006

(65) Prior Publication Data
US 2006/0290803 A1    Dec. 28, 2006

(30) Foreign Application Priority Data
Jun. 24, 2005 (JP) .............................. 2005-185476

(51) Int. Cl.
H04N 5/232 (2006.01)
(52) U.S. Cl. ............. 348/346; 348/208.14; 348/208.15; 348/169
(58) Field of Classification Search ................. 348/346, 348/208.15, 169
See application file for complete search history.

(56) References Cited

U.S. PATENT DOCUMENTS

| | | | | |
|---|---|---|---|---|
| 4,928,179 A | * | 5/1990 | Takahashi et al. ........ | 348/211.2 |
| 5,065,249 A | * | 11/1991 | Horn et al. .................. | 348/376 |
| 6,801,714 B2 | * | 10/2004 | Kitazawa et al. ........... | 386/120 |
| 6,937,286 B2 | * | 8/2005 | Takeda ........................ | 348/373 |
| 2001/0012445 A1 | * | 8/2001 | Kitazawa et al. ........... | 386/117 |
| 2001/0028796 A1 | * | 10/2001 | Yamanaka et al. .......... | 396/281 |
| 2002/0008774 A1 | * | 1/2002 | Yata et al. .................... | 348/375 |
| 2005/0052569 A1 | * | 3/2005 | Ibaraki et al. ............... | 348/375 |
| 2005/0174475 A1 | * | 8/2005 | Yoshida ....................... | 348/370 |
| 2006/0061653 A1 | * | 3/2006 | Hampapur et al. .......... | 348/143 |

FOREIGN PATENT DOCUMENTS

| | | |
|---|---|---|
| JP | 05-144805 A | 6/1993 |
| JP | 2001-251537 A | 9/2001 |
| JP | 2004-222037 A | 8/2004 |

* cited by examiner

*Primary Examiner*—Jason Chan
*Assistant Examiner*—Usman Khan
(74) *Attorney, Agent, or Firm*—Canon U.S.A., Inc. I.P. Division

(57) ABSTRACT

An image-pickup apparatus which includes an imaging unit configured for obtaining object images, a notification unit configured to perform notification that images are being obtained by the imaging unit, a macro-mode setting unit configured to set the imaging unit in a macro mode, and a notification control unit configured to control the notification operation of the notification unit in accordance with whether the macro mode is set or not by the macro-mode setting unit.

5 Claims, 6 Drawing Sheets

IMAGE PICKUP APPARATUS AND A NOTIFICATION OPERATION CONTROL METHOD

BACKGROUND OF THE INVENTION

1. Field of the Invention

The present invention relates to an image-pickup apparatus, a control method of the image-pickup apparatus, a computer program, and a memory medium. And in particular, the present invention relates to a technique suitable for obtaining desirable recorded moving images and desirable recorded static images in the moving images during close-range taking, for example.

2. Description of the Related Art

A general video camera is equipped with a tally light (a lamp showing a camera operating) so as to blink the tally light during movie recording. Thereby, a picture taker and a person to be imaged can confirm the video camera is in a recording mode.

Video cameras capable of being operated by remote-control with a remote controller are proposed as prior arts related thereto. Japanese Patent Laid-Open No. H05-144805 discloses processing of the blinking control of the tally light for specifying video-camera control contents contained with receiving signals in addition to the tally light blinking for indicating the recording and for confirming received sending signals from the remote controller. With such a configuration, an operator of the remote controller may easily confirm an established state of the video camera.

Not only the digital video cameras, but also digital cameras capable of recording moving images have been introduced along with recent development of the digital cameras. In such digital cameras, an indication lamp of a self-timer conventionally provided in cameras blinking while using the self-timer is indistinguishable from the tally light blinking during movie recording. As a result, this may lead to confusion in identifying a shooting mode by a user. In order to solve this problem, Japanese Patent Laid-Open No. 2001-251537 discloses a method using emission patterns different from each other for distinguishing the indication of the self-timer indication lamp during static image taking from the indication of the tally light during the movie recording.

In such a manner, the tally light is actively used having a function to inform a picture taker and a person to be imaged of an operating state of the digital video/digital camera in addition to the function to indicate the movie recording.

It would be desirable to provide a notification operation suitable for a macro mode by controlling the notification operation of a notification unit in accordance with that whether the macro mode is set or not.

Moreover, it would be also desirable to provide a notification operation suitable for a focus detection range to be set by controlling the information operation of a notification unit in accordance with the focus detection range set by a focal point detection range setting unit.

SUMMARY OF THE INVENTION

Accordingly, the present invention provides a notification operation suitable for a macro mode by controlling the notification operation of a notification unit in accordance with that whether the macro mode is set or not.

Moreover, the present invention provides a notification operation suitable for a focus detection range to be set by controlling the information operation of a notification unit in accordance with the focus detection range set by a focal point detection range setting unit.

According to an exemplary embodiment of the present invention, an image-pickup apparatus is provided which includes an imaging unit configured to obtain object images; a notification unit configured to perform notification that images are being obtained by the imaging unit; a macro-mode setting unit configured to set the imaging unit in a macro mode; and a notification control unit configured to control the notification operation of the notification unit in accordance with whether the macro mode is set or not by the macro-mode setting unit.

According to an aspect of the embodiment, when the macro mode is set, the notification control unit does not perform the notification operation. According to another aspect of the embodiment, the notification unit includes a tally light, and when the macro mode is set, the notification control unit reduces the luminance of the tally light to less than that when an image-picking mode other than the macro mode is set.

According to another exemplary embodiment of the present invention, an image-pickup apparatus is provided which includes an imaging unit configured to obtain object images; a lens unit for focusing the object images on the imaging unit; a focal point detection unit configured to detect a focusing state of the lens unit; an notification unit configured to perform notification that images are being obtained by the imaging unit; a focus detection range setting unit configured to set a focus detection range of the focus detection unit; and an notification control unit configured to control the notification operation of the notification unit in accordance with the focus detection range set by the focus detection range setting unit.

According to another aspect of the embodiment, the notification control unit changes the notification operation of the notification unit in between cases where the focus detection range is set closer than a predetermined distance and the focus detection range is set further than the predetermined distance. And furthermore, according to yet another aspect of the present invention, when the focus detection range is set closer than the predetermined distance, the notification control unit does not perform the notification operation. Additionally, according to still another aspect of the present invention the notification unit includes a tally light, and when the focus detection range is set closer than the predetermined distance, the notification control unit reduces the luminance of the tally light smaller than that when the focus detection range is set further than the predetermined distance.

Furthermore, according to yet another exemplary embodiment of the present invention, a control method is provided for an image-pickup apparatus including an imaging unit configured to obtain object images, a notification unit configured to perform notification that images are being obtained by the imaging unit, and a macro-mode setting unit configured to set the imaging unit in a macro mode. Here, the method includes determining whether the macro mode is set by the macro-mode setting unit; and controlling the notification operation of the notification unit in accordance with the determined result.

Moreover, according to yet another exemplary embodiment of the present invention, a control method is provided for an image-pickup apparatus including an imaging unit configured to obtain object images, a lens unit for focusing the object images on the imaging unit, a focus detection unit configured to detect the focusing state of the lens unit, and a notification unit configured to perform notification that images are being obtained by the imaging unit. Here, the method includes setting a focus detection range for the focus detection unit; and controlling the notification operation of the notification unit in accordance with the set focus detection range set.

Additionally, according to yet another exemplary embodiment of the present invention, a computer readable medium is provided which contains computer-executable instructions for executing a control method for an image-pickup apparatus including an imaging unit configured to obtain object images, an notification unit configured to perform notification that images are being obtained by the imaging unit, and a macro-mode setting unit configured to set the imaging unit in a macro mode. The medium includes computer-executable instructions for determining whether the macro mode is set by the macro-mode setting unit; and computer-executable instructions for controlling the notification operation of the notification unit in accordance with the determined result.

And also, according to yet another exemplary embodiment of the present invention, a computer readable medium is provided which contains computer-executable instructions for executing a control method for an image-pickup apparatus including an imaging unit configured to obtain object images, a lens unit for focusing the object images on the imaging unit, a focus detection unit configured to detect a focusing state of the lens unit, and a notification unit configured to perform notification that images are being obtained by the imaging unit. Here, the medium includes computer-executable instructions for setting a focus detection range of the focus detection unit; and computer-executable instructions for controlling the notification operation of the notification unit in accordance with the set focus detection range.

Further features of the present invention will become apparent from the following description of exemplary embodiments with reference to the attached drawings.

DESCRIPTION OF THE EMBODIMENTS

First Exemplary Embodiment

Figure 1:
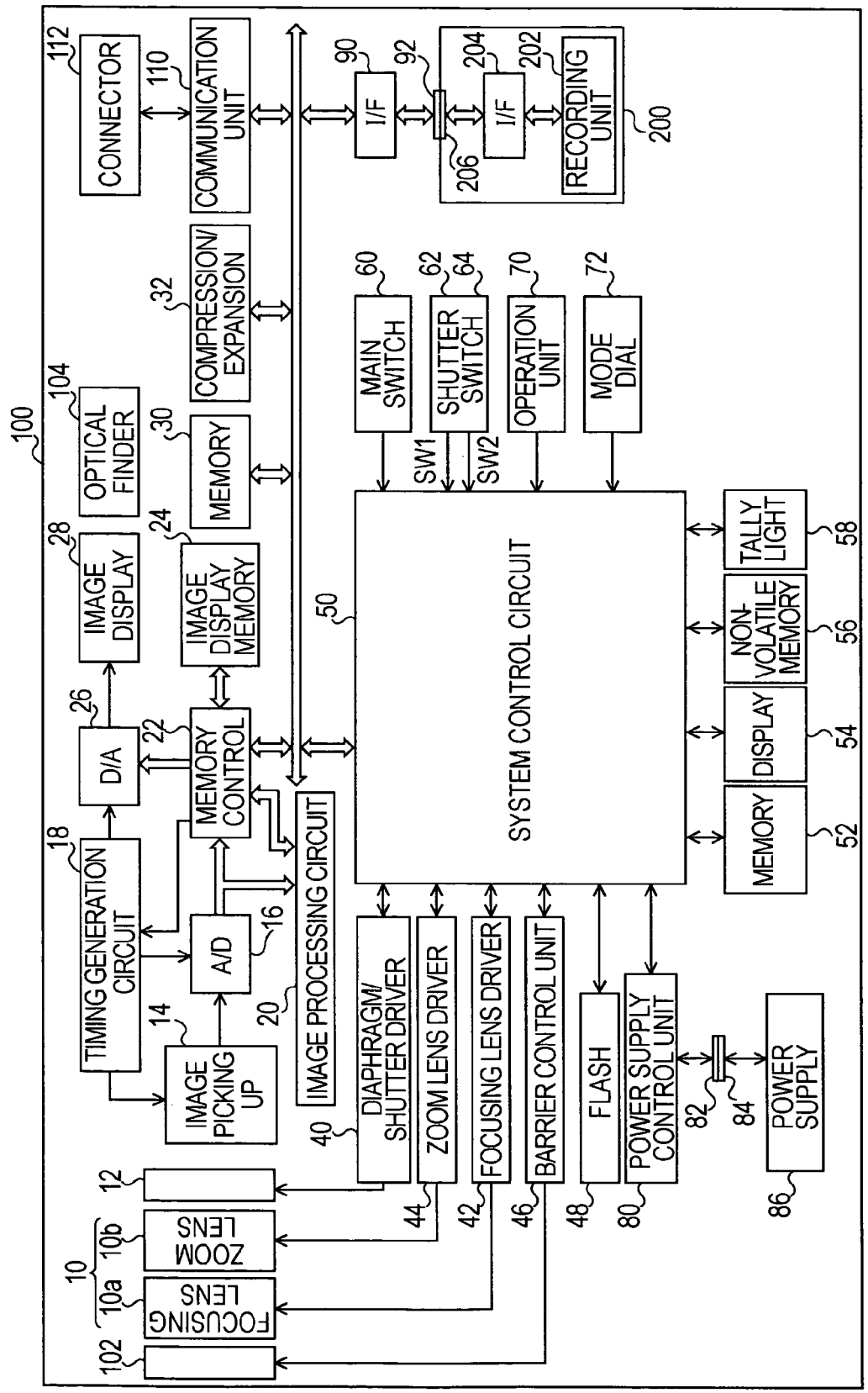
FIG. 1 is a block diagram of an example of an image-pickup apparatus according to first and second exemplary embodiments of the present invention.

An example of a movie recording in a macro mode (close-range taking mode) according to a first exemplary embodiment of the present invention will now herein be described. FIG. 1 is a block diagram of an exemplary image-pickup apparatus 100 according to the first exemplary embodiment.

A taking lens 10 is composed of a focusing lens 10a and a zoom lens 10b; reference numeral 12 denotes a shutter with a diaphragm function; numeral 14 an image-pickup element for converting optical images into electrical signals; and numeral 16 an A/D converter for converting an analog-signal output from the image-pickup element into digital signals. A timing generating circuit 18 is controlled by a memory control circuit 22 and a system control circuit 50 so as to feed clock signals and control signals to the A/D converter 16 and a D/A converter 26.

An image processing circuit 20 performs predetermined pixel interpolation processing and color conversion processing on the data from the A/D converter 16 or the data from the memory control circuit 22. In the image processing circuit 20, using picked-up image data, predetermined arithmetic processing is executed, and on the basis of the calculated result obtained, the system control circuit 50 performs TTL (through the lens) type AF (auto 9. focus) processing, AE (auto exposure) processing, and EF (electronic pre-flashing) processing on a diaphragm/shutter driver 40 and a focusing lens driver 42.

Furthermore, in the image processing circuit 20, using picked-up image data, predetermined arithmetic processing is executed, and on the basis of the calculated result obtained, TTL type AWB (auto white balance) processing is also executed.

A memory control circuit 22 controls the A/D converter 16, the timing generating circuit 18, the image processing circuit 20, an image display memory 24, the D/A converter 26, a memory 30, and a compression/expansion circuit 32. The data of the A/D converter 16 is written in the image display memory 24 or the memory 30 via the image processing circuit 20 and the memory control circuit 22, or via the memory control circuit 22 directly.

The image data for display written in the image display memory 24 is displayed on an image display 28 composed of a TFT and an LCD via the D/A converter 26. Hence, when the picked-up image data is sequentially displayed on the image display 28, an electronic finder function can be achieved. The image display 28 can also be turned on/off by the arbitrary instruction of the system control circuit 50. When the display is turned off, the power consumption of the image-pickup apparatus 100 can be largely reduced.

The memory 30 is for storing static images and moving images and has a memory capacity sufficient for storing a predetermined number of static images and a predetermined time-frame of moving images. Thereby, even in continuous shooting of a plurality of static images and panoramic exposure, a large amount of images can be written in the memory 30 at high speed.

The memory 30 may also be used for a work space of the system control circuit 50. The compression/expansion circuit 32 compresses/expands image data by adaptation/discrete cosine transformation (ADCT), wavelet transformation or the like. The compression/expansion circuit 32 reads images stored in the memory 30 so as to compress or expand them, and then write the processed data to the memory 30.

The diaphragm/shutter driver 40 controls the shutter with the diaphragm function 12, and also has a flash-lighting control function by cooperating with a flash 48. The focusing lens driver 42 controls the driving of the focusing lens 10a; a zoom lens driver 44 drives the zoom lens 10b; and a barrier control unit 46 controls the operation of a protection part 102 which is a barrier.

The flash 48 also has a floodlight function of AF auxiliary light and a flash-lighting control function. On the basis of the result of picked-up image data calculated by the image processing circuit 20, the system control circuit 50 controls the diaphragm/shutter driver 40 and the focusing lens driver 42 so as to control exposure and focusing. The system control circuit 50 controls the entire image-pickup apparatus 100; and a memory 52 stores the operating constants and variables of the system control circuit 50.

A liquid crystal display 54 including a speaker displays operation states and messages with characters, pictures, and voices in accordance with the program execution in the system control circuit 50. One or a plurality of the liquid crystal displays 54 are provided in the vicinity of the operation unit of the image-pickup apparatus 10 at visible positions, and are configured to combine an LCD, an LED, and a sounding body.

Part of the function of the liquid crystal display 54 is provided in an optical finder 104. Among contents of the liquid crystal display 54, contents displayed on the LCD include a single-shot/continuous shooting sign, a self timer sign, a compression rate sign, a recording pixel number sign, a recorded medium number sign, a remaining medium number sign, a shutter speed sign, a diaphragm setting-value sign, a flash sign, a red-eye reduction sign, a macro-shooting sign, a buzzer set sign, a remaining clock-battery sign, a remaining battery sign, an error sign, an information sign with multi-digit, a mounting state sign of a memory medium 200, an operating sign of a communication I/F, a date/time sign, and a connection state sign to an external computer.

Among display contents of the liquid crystal display 54, contents displayed in the optical finder 104 include a focusing sign, a shooting ready sign, a camera-shake alarm, a flash charging sign, a flash-charge completion sign, the shutter speed sign, the diaphragm setting-value sign, an exposure correction sign, and a writing operation sign on the memory medium. Furthermore, of the display contents on the liquid crystal display 54, contents displayed on the LED include the focusing sign, the shooting ready sign, the camera-shake alarm, the flash charging sign, the flash-charge completion sign, the writing operation sign on the memory medium, a macro-shooting set informing sign, and a secondary battery charging sign.

A tally light 58 according to the embodiment lights up, lights off, or blinks for informing of movie recording. The tally light 58 may also be used as a self-timer information sign and an AF auxiliary light in addition to the information of the movie recording. A non-volatile memory 56 is erasable and recordable using an FEP ROM and a flash memory.

Reference numerals 60, 62, 64, 70, and 72 represent operation units for inputting various operation instructions of the system control circuit 50, including any one of or the multiple combination of a switch, a dial, a touch panel, pointing by detecting eyeshot, and a sound recognition unit.

These operation units will be specifically described. The power supply switch (main switch) 60 switches the turning on/off of the image-pickup apparatus 100, and it also establishes the switching of the power-supply turning on/off of various kinds of attached equipment connected to the image-pickup apparatus 100.

The first shutter switch SW1 62 is turned on by the halfway pushing of a shutter button (not shown) so as to instruct starting of AF (auto focus) processing, AE (auto exposure) processing, AWB (auto white balance) processing and EP (electronic pre-flashing) processing.

The second shutter switch SW2 64 is turned on by the pushing completion of a shutter button (not shown) so as to instruct starting of a series of processing including exposure processing of writing the signals read out of the image-pickup element 14 on the memory 30 via the A/D converter 16 and the memory control circuit 22, developing processing using the computation in the image processing circuit 20 and the memory control circuit 22, and recording processing of writing image data on the memory medium 200 by reading image data out of the memory 30 and compressing it in the compression/expansion circuit 32.

The operation unit 70 composed of various buttons and a touch panel includes a menu button, a set button, a macro button, a multi-picture reproducing newpage button, a flash set button, a single-shoot/continuous-shoot/self-timer switch button, a menu movement + button, a menu movement − button, a reproducing image movement + button, a reproducing image movement − button, an image quality selecting button, an exposure correction button, a date/time setting button, an image display ON/OFF button, a compression mode switch, a quick review switch for setting a quick review function automatically reproducing the image data picked up directly before on the image display 28, a select switch for selecting various functions during shooting/reproducing/communicating, and an execution switch for executing various functions during shooting/reproducing/communicating.

The compression mode switch is for selecting a compression rate of JPEG (joint photographic expert group) compression, or for selecting a CCDRAW mode for recording signals of the image-pickup element on the memory medium by digitizing the signals as they are.

The JPEG compression mode includes a normal mode and a fine mode prepared. A user of the image-pickup apparatus 100 may select the normal mode when attaching importance to the data size of picked-up images and may select the fine mode when attaching importance to the quality of picked-up images so as to take picture.

In the JPEG compression mode, the image data is read out of the image-pickup element 14, and this data, written in the memory 30 via the A/D converter 16, the image processing circuit 20, and the memory control circuit 22, is read out and recorded on the memory medium 200 by compressing the data at the compression rate set by the compression/expansion circuit 32.

In the CCDRAW mode, the image data is read out every one line as it is corresponding to the pixel arrangement of the color filters of the image-pickup element 14, and this image data written in the memory 30 is read out via the A/D converter 16 and the memory control circuit 22 so as to record it on the memory medium 200.

The mode dial switch 72 can switch the function mode including an automatic shooting mode, a shooting mode, a panorama shooting mode, a reproducing mode, a multi-picture reproducing/erasing mode, and a PC connection mode. According to the embodiment, the image-pickup apparatus 100 is especially provided with the shooting mode, the reproducing mode, and a print service mode.

A power supply control unit 80, including a battery detection circuit, a DC-DC converter, and a switch circuit for switching an electrically working block, detects the presence of a battery, the kind of the battery, and the remaining battery charge. The DC-DC converter is controlled by the detection result and the instruction of the system control circuit 50 so as to feed a necessary voltage for a necessary duration to various units including the memory medium.

Reference numerals 82 and 84 denote connectors; numeral 86 a power supply including a primary battery, such as an alkaline cell and a lithium cell, a secondary battery, such as a NiCd cell, a NiMH cell, and a Li-ion cell, and an AC adapter; numeral 90 represents an interface to the memory medium, such as a memory card and a hard disk; numeral 92 represents a connector for connecting to the memory medium, such as the memory card and the hard disk; numeral 102 a protection part which is a barrier for preventing the contamination and damage of an image-picking unit by covering the image-picking unit including a lens 10 of the image-pickup apparatus 100.

Only using the optical finder 104, the image-picking up is possible without using the electronic finder function of the image display 28. Also, part of the function of the liquid crystal display 54 is provided in an optical finder 104, which includes the focusing sign, the camera shake alarm, the flash charging sign, the shutter speed sign, the diaphragm setting value, and the exposure correction sign, for example.

A connector 112 is used when connecting to other instruments by a communication unit 110. The communication unit 110 may include/or implement, for example, wire communicating features which use RS232C standards, USB (universal serial bus), and IEEE 1394 (data transport bus). The memory medium 200 may include a memory card and a hard disk.

The memory medium 200 is provided with a recording unit 202 including a semiconductor memory and a magnetic disk, an interface 204 to the image-pickup apparatus 100, and a connector 206 connecting to the image-pickup apparatus 100.

(Exemplary Moving Image Principal Picking Up Operation)

Next, an exemplary operation of the image-pickup apparatus according to the first embodiment configured as described above will be described in detail with reference to FIGS. 1 to 4.

Figure 3:
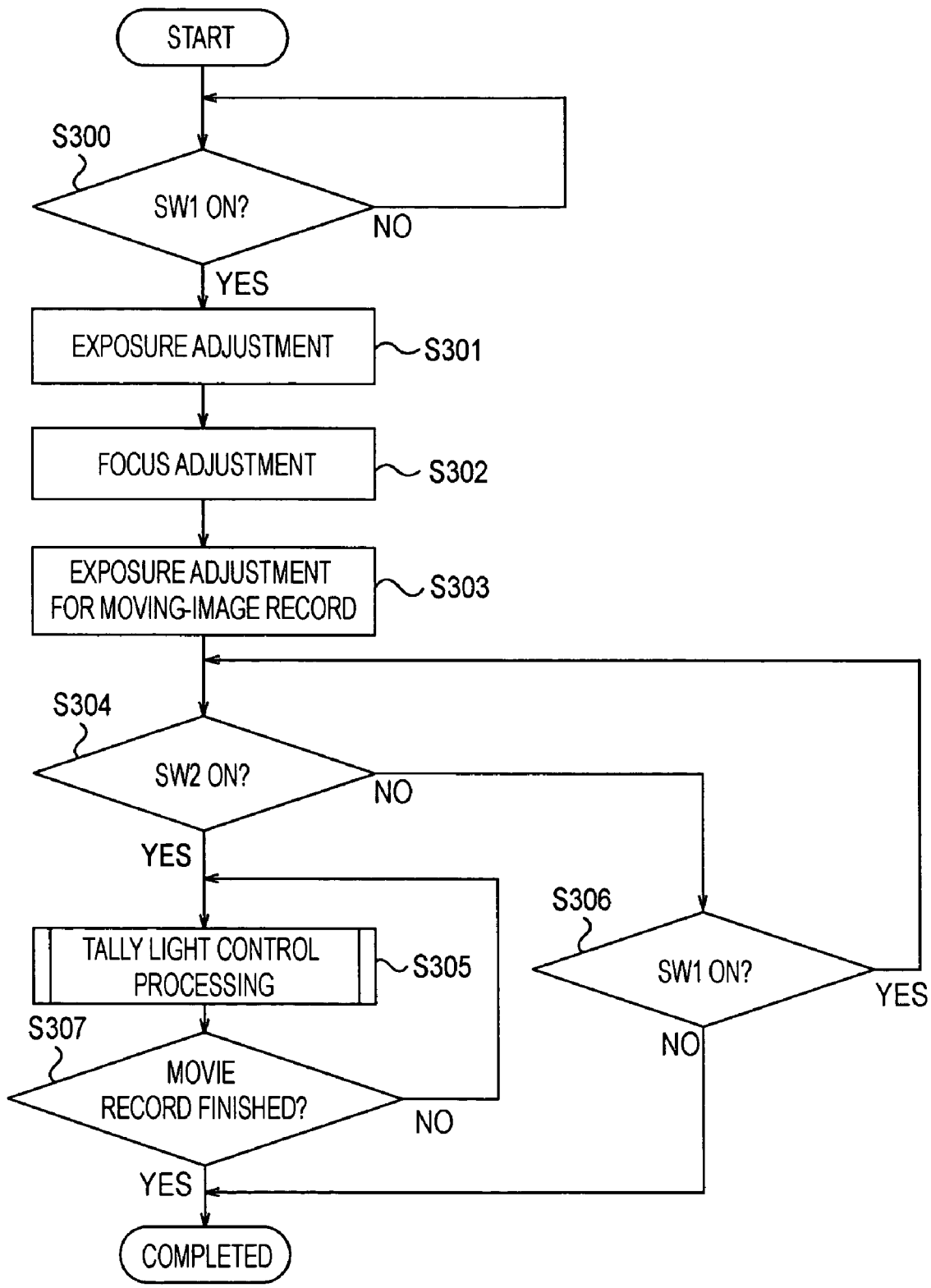
FIG. 3 is a flowchart for illustrating a series of exemplary processes of movie recording according to the first embodiment of the present invention.

By turning on the first shutter switch SW1 (62) of the image-pickup apparatus 100 shown in FIG. 1, the exemplary image-pickup processing sequence shown in the flowchart of FIG. 3 is executed. As shown in FIG. 3, upon starting the processing, at Step S300 first, the ON/OFF state of the first shutter switch SW1 (62) is detected. If OFF (NO in S300), the process does not move, and if ON (YES in S300), the process proceeds to Step S301.

At Step S301, the exposure is adjusted before the focal point adjustment. After the completion of this adjustment, at Step S302, the focal point is adjusted. After the completion of this adjustment, at Step S303, the exposure for the moving image record is adjusted so as to have an exposure suitable for moving image picking up. After the completion of this adjustment, at Step S304, the ON/OFF state of the second shutter switch SW2 (64) is detected.

As a result of this detection, if the second shutter switch SW2 (64) is OFF, the process proceeds to Step S306 so as to detect the state of the first shutter switch SW1 (62). If it is ON (YES in S306), the process proceeds to Step S304 again so as to detect the state of the second shutter switch SW2 (64). If the first shutter switch SW1 (62) is OFF (NO in S306), the processing is finished.

Accordingly, according to the embodiment, the movie recording is not started thereafter unless the condition is established in that the first shutter switch SW1 (62) is turned ON as well as the second shutter switch SW2 (64) is turned ON.

On the other hand, as a result of the detection at Step S304, when the second shutter switch SW2 (64) is ON (YES in S304), the process proceeds to Step S305 so as to operate the movie recording including the tally light control. This processing will be described later in detail. After the processing completion at Step S305, the movie recording including the controlling the tally light is continued until the movie recording completion is detected at Step S307.

The movie recording completion according to the embodiment is a case where the second shutter switch SW2 (64) is turned ON by a picture taker during recording the moving image or a case where the free space of the memory medium 200 is reduced blow a predetermined value. When any one of the above cases is established, the movie recording is finished, and if otherwise, it is continued.

(Exemplary Controlling the Tally Light During Movie Recording)

Next, the flow of an exemplary process for controlling the tally light shown in Step S305 of FIG. 3 will be described with reference to the flow sheet of FIG. 2. Various determination processes, which will be described herein, may be executed by the system control circuit 50 shown in FIG. 1. Various determined results and calculated results outputted from the system control circuit 50 may be stored in the memory 52, and are read out if necessary so as to execute desired processing thereon.

Figure 2:
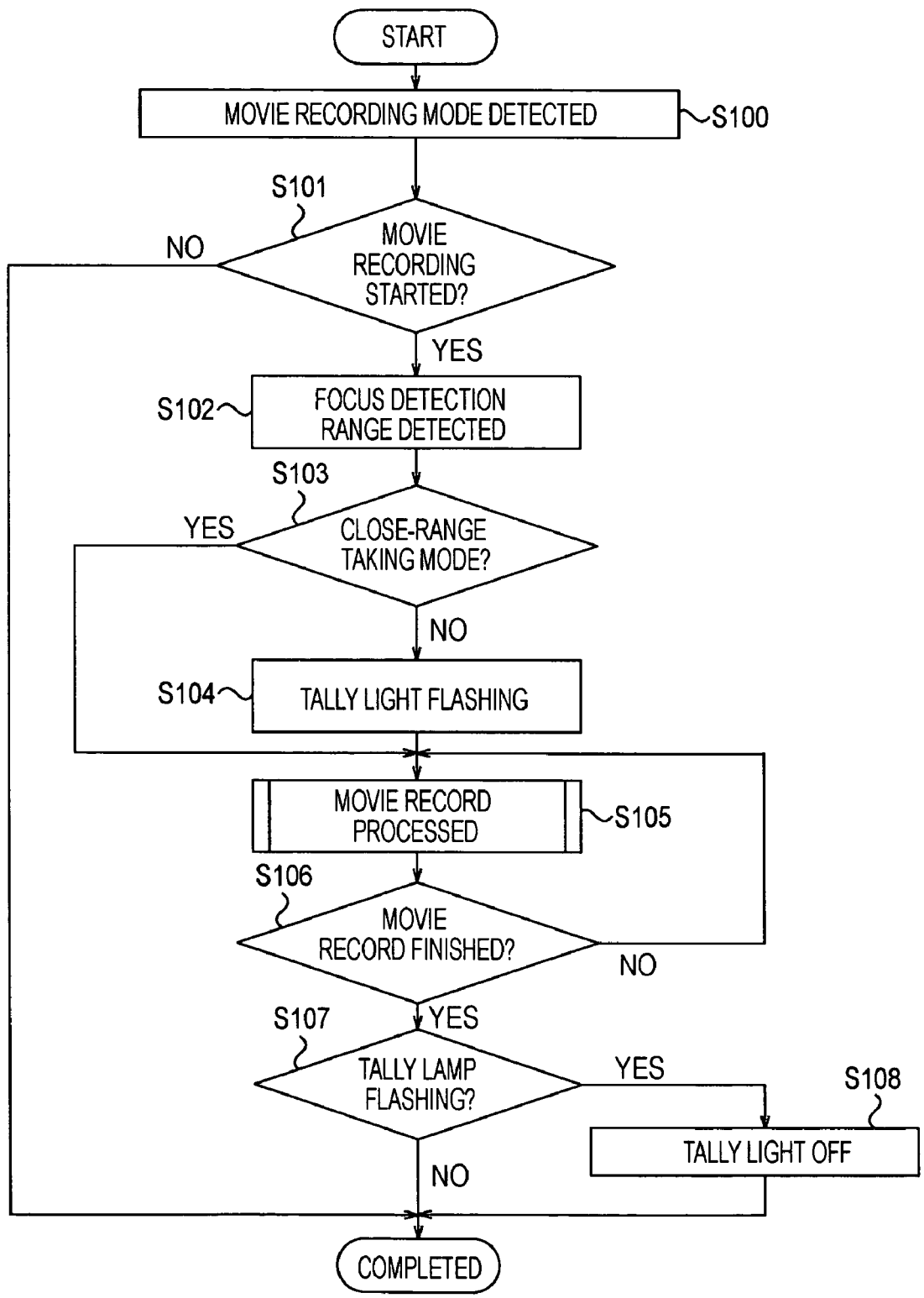
FIG. 2 is a flowchart illustrating an exemplary control method of a tally light according to the first embodiment of the present invention.

In FIG. 2, first a moving-image recording mode is detected at Step S100. Then, it is next determined whether a moving-image recording has been initiated at S101. As a result of this determination, if the movie recording is not going to start (NO in S101), the processing is finished. If the movie recording is going to start (YES in S101), the process proceeds to next to Step S102 so as to obtain the setting state of the focal-point detection range presently established in the image-pickup apparatus 100.

Then, the process proceeds to Step S103 so as to determine whether the focal-point detection range setting is in a macro mode (close-range taking mode) or not. If it is not (NO in S103), the tally light is started to blink for informing the movie recording at Step S104, and then, the process proceeds to Step S105 so as to start recording the moving image. As a result of the determination at Step S103, if it is in the macro mode (YES in S103), the process at Step S104 is not executed but the recording the moving image is started at Step S105.

Figure 4:
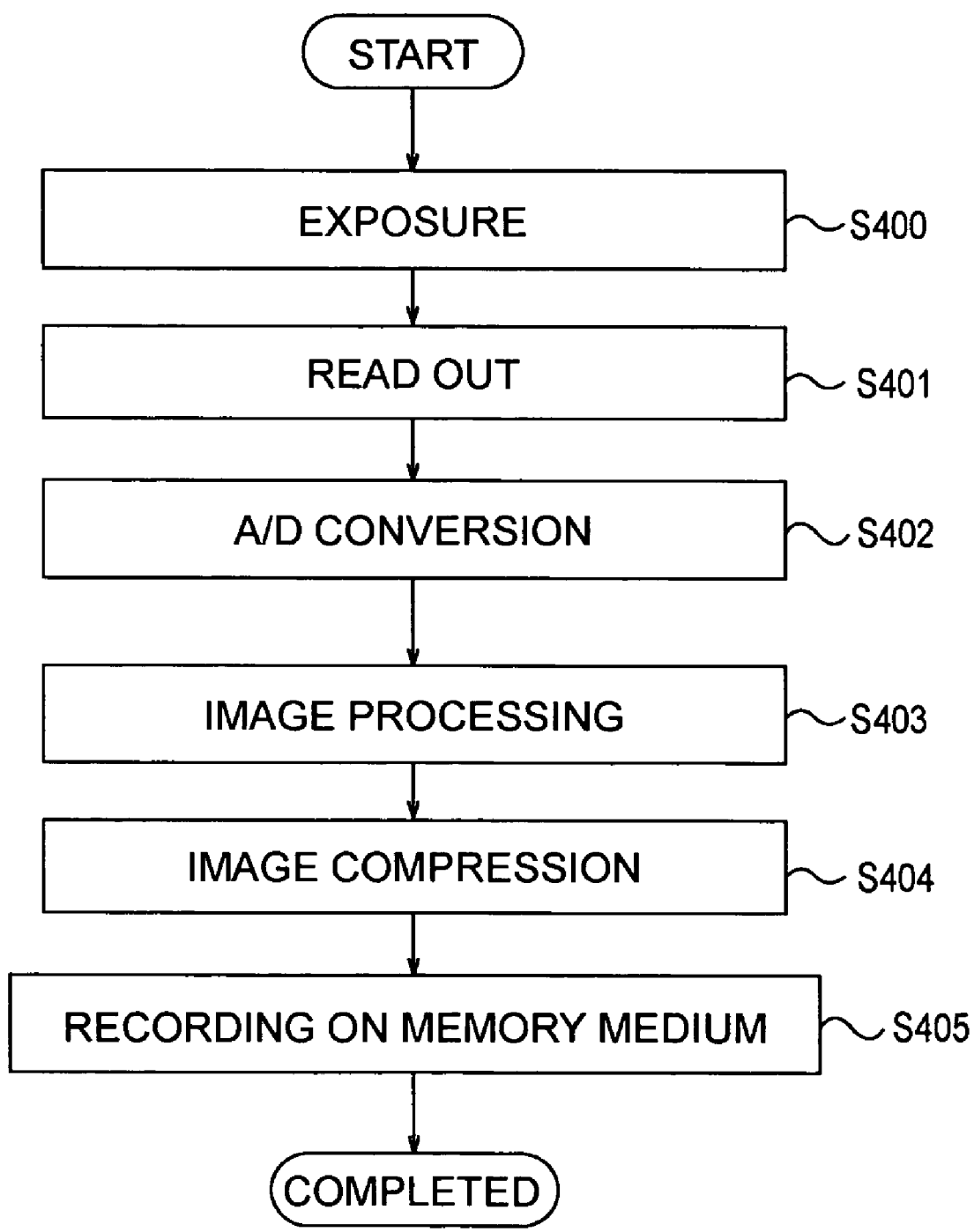
FIG. 4 is a flowchart for illustrating an exemplary procedure of the movie recording to the first embodiment of the present invention.

The exemplary process at Step S105 will be described below in detail with reference to FIG. 4. First, at Step S400, the image-pickup element 14 is exposed. Then, at Step S401, the data stored in the image-pickup element 14 is read out. Next, at Step S402, using the A/D converter 16, the analog signal read out of the image-pickup element 14 is converted into the digital signal. At Step S403, using the image processing circuit 20, various kinds of image processing are performed. Then, at Step S404, the image processed at Step S403 is compressed in a shape suitable for the movie recording. At Step S405, the data compressed at Step S404 is transferred via the memory medium I/F 90 to the memory medium 200, such as a memory card mounted on the image-pickup apparatus body, and is stored therein so as to complete the processing thereafter. These steps are the movie recording shown at Step S105 of FIG. 2.

Returning back to the flowchart of FIG. 2, the process proceeds to Step S106 from Step S105 so as to determine whether the movie recording completion condition is established or not. As a result of the determination, if the completion condition is not established (NO in S106), the movie recording is continued. If it is established (YES in S106), the process proceeds to Step S107 so as to determine whether the tally light 58 is blinking or not.

As a result of the determination, if the tally light 58 is blinking (YES in S107), the process proceeds to Step S108 so as to turn the tally light 58 off. If it is not blinking (NO in S107), the movie recording is finished as it is. Then the process is completed.

As described above, in the macro mode (close-range taking mode), since the operation of the tally light 58 is suppressed by the operation of the image-pickup apparatus 100, when the distance between an object and the image-pickup apparatus 100 is small, the light from a light emission device and reflected by the object is prevented in advance from being transferred to the moving image, which is being recorded, so as to provide the excellent moving image to a picture taker.

According to the embodiment, the tally light 58 is not allowed to blink; however, the present invention is not limited to this, so that during the recording the moving image in the macro mode (close-range taking mode), the light emission amount from the tally light 58 may be controlled in a suitable value calculated from the ranging extent so as to blink the tally light 58.

Second Exemplary Embodiment

Next, an exemplary operation of an image-pickup apparatus according to a second exemplary embodiment of the present invention will now herein be described in detail with reference to FIGS. 5 and 6. According to the second embodiment, a case where a static image is recordable during recording the moving image is exemplified. The configuration of the image-pickup apparatus is similar to that of the first embodiment shown in FIG. 1.

(Tally Light Control When Picking Up a Static Image While Recording the Moving Image)

According to the embodiment, the movie recording is the same or similar process as that of the first embodiment. Upon describing the embodiment, the moving image is assumed to already start. Furthermore, various kinds of determination processing below may be executed by the system control circuit 50 shown in FIG. 1. Various determined results and calculated results outputted from the system control circuit 50 may be stored in the memory 52, and are read out if necessary so as to execute desired processing thereon.

An exemplary static image picking up during recording the moving image and the control of the tally light 58 will be described in detail with reference to FIG. 5. First, at Step S200, it is detected whether the moving image is being recorded or not. Then, at Step S201, it is determined whether the movie recording is started or not. If not started (NO in S201), the process is completed. If it is started (YES in S201), the process proceeds to Step S202 so as to obtain the focal-point detection range established in the image-pickup apparatus 100.

Then, the process proceeds to Step S203 so as to determine whether the focal-point detection range obtained at Step S202 is in the macro mode (close-range taking mode) or not. As a result of the determination at Step S214, if it is not in the macro-mode (No in S203), the process proceeds to Step S205. At Step S205, the tally light is started to blink for informing of the recording of the moving image. Then, at Step S214, the process waits for the movie recording completion. On the other hand, as a result of the determination at Step S203, if it is in the macro-mode, the process proceeds to Step S204. At Step S204, the tally light is started to blink with a luminance lower than that executed in the process at Step S205.

Then, the process proceeds to Step S206 so as to determine the ON/OFF state of the first shutter switch SW1 (62). As a result of the determination, if it is OFF (NO in S206), the process proceeds to Step S214 so as to determine the completion of the movie recording in S214. As a result of the determination in S214, if it is not completed (NO in S214), the process returns back to Step S206 so as to continue the movie recording. Meanwhile, the dimmed blinking of the tally light is also continued. As a result of the determination at Step S214, if the movie recording is completed (YES in S214), the process proceeds to Step S215 so as to turn the tally light 58 off and to complete the processing.

As a result of the determination at Step S206, if the first shutter switch SW1 (62) is ON (YES in S206), the process proceeds to Step S207 so as to obtain the focal-point detection range established in the image-pickup apparatus 100.

Then, the process proceeds to Step S208 so as to determine whether the focal-point detection range obtained at Step S207 is in the macro mode (close-range taking mode) or not. As a result of the determination, if it is in the macro-mode, the tally light 58 is turned off at Step S209, and then, the process proceeds to Step S210. As a result of the determination at Step S208, if it is not in the macro-mode, the process directly proceeds to Step S210 jumping Step S209.

Step S210 is the static image recording processing, which will be described with reference to FIG. 6. First, the ON/OFF state of the first shutter switch SW1 (62) is determined at Step S500. If OFF (NO), the process does not move, and if ON (YES), the process proceeds to Step S501 so as to adjust the exposure before the focal point adjustment. After the completion of this processing, the process proceeds to Step S502 so as to adjust the focal point. After the completion of the focal point adjustment, the principal exposure adjustment is performed at Step S503 so as to have the exposure suitable for picture taking.

Upon completion of the principal exposure adjustment at Step S503, the ON/OFF state of the second shutter switch SW2 (64) is determined at Step S504. As a result of the determination, if it is OFF, the process proceeds to Step S511 so as to detect the state of the first shutter switch SW1 (62), and if it is ON, the processing at Step S504 is again performed so as to detect the state of the second shutter switch SW2 (64).

If the first shutter switch SW1 (62) is OFF in the state detection at Step S511, the image picking up is completed. Accordingly, the image picking up is not started thereafter unless the condition is established in that the first shutter switch SW1 (62) is turned ON as well as the second shutter switch SW2 (64) is turned ON.

If the second shutter switch SW2 (64) is ON at Step S504, the process proceeds to Step S505 so as to expose the image-pickup element 14 to light at Step S505. Then, at Step S506, the data stored in the image-pickup element 14 is read out. At Step S507, using the A/D converter 16, the analog signal read out of the image-pickup element 14 is converted into the digital signal.

Then, at Step S508, using the image processing circuit 20, various kinds of image processing are performed. Then, at Step S509, the image processed at Step S508 is compressed according to a format such as JPEG (joint photographic expert group: a compression system of a color static image). Then, the process proceeds to Step S510 so as to transfer the data compressed at Step S509 to the memory medium 200 such as a memory card mounted in the image-pickup apparatus body via the memory medium I/F 90. This has been the outline of the static image recording process.

Figure 5:
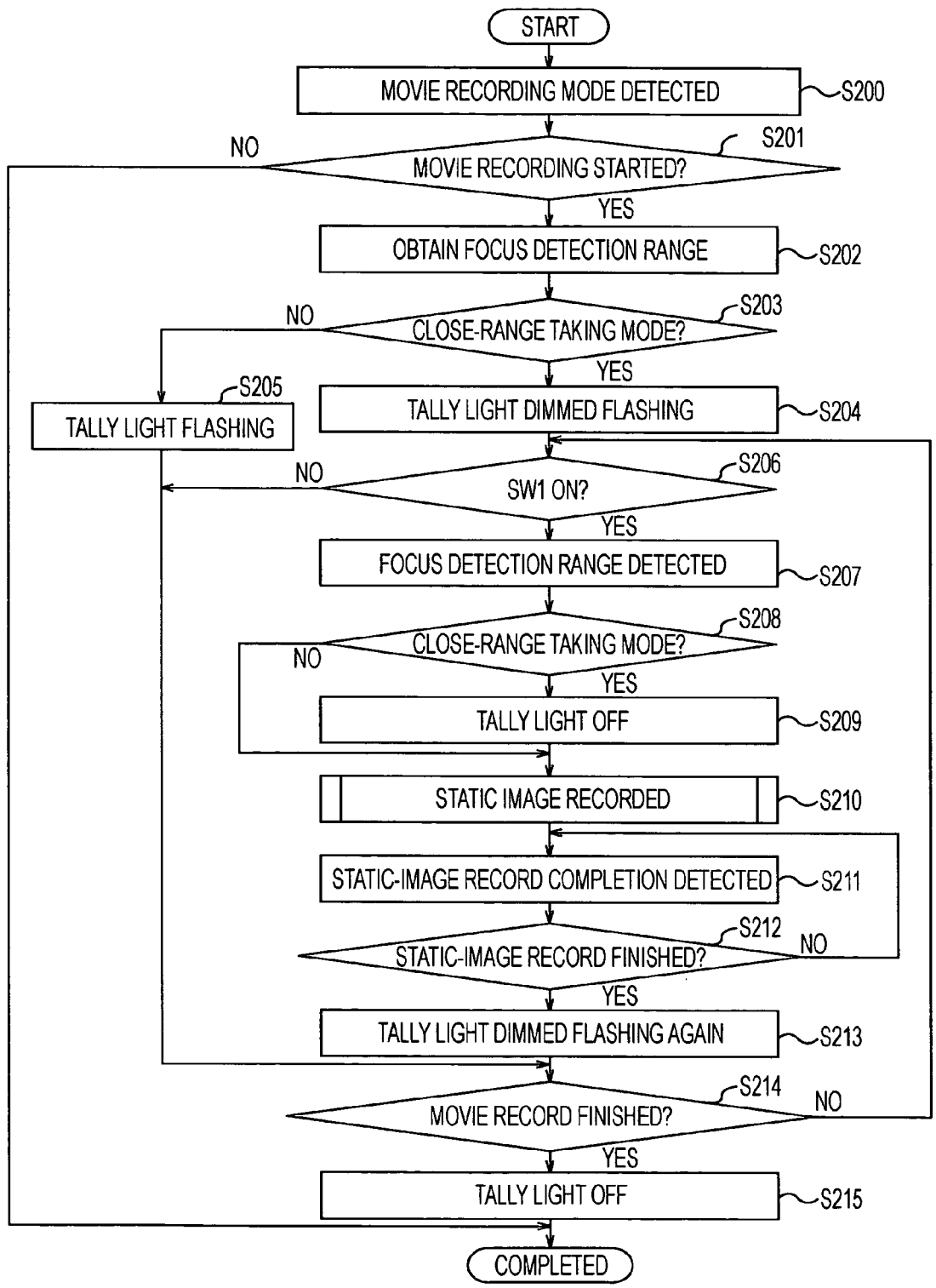
FIG. 5 is a flowchart for illustrating an exemplary control method of a tally light in static-image pickup processing during movie recording according to the second embodiment of the present invention.
Figure 6:
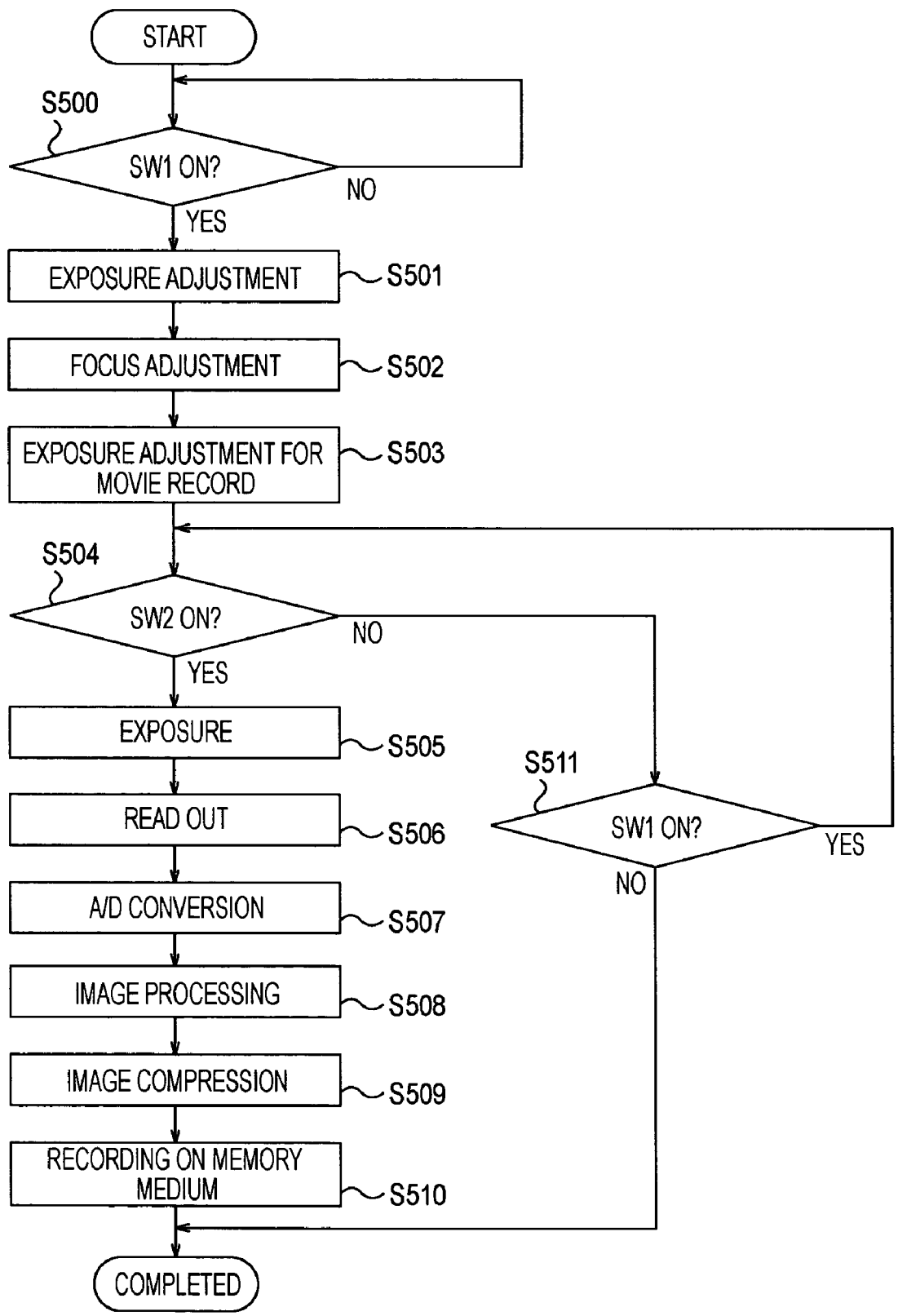
FIG. 6 is a flowchart for illustrating an exemplary procedure of the static-image pickup processing during movie recording according to the second embodiment of the present invention.

Returning back to the flowchart of FIG. 5, after the static image recording at Step S204, the process proceeds to Step S211 so as to detect the completion of the static image picking up. Then, at Step S212, it is determined whether the static image recording is completed or not. As a result of the determination at Step S212, if the static image recording is not completed (NO in S211), the process returns back to Step S211 so as to continue detecting the completion state. As a result of the determination at Step S212, if the static image recording is completed, the process proceeds to Step S213 so as to again start the dimmed blinking of the tally light 58, which has been turned off.

Then, at Step S214, it is determined whether the completion of the movie recording is detected or not. As a result of the determination, if the movie recording is not completed (NO in S214), the process returns back to Step S206 so as to continue recording the moving image. If the movie recording is completed (YES in S214), the tally light 58 is turned off so as to finish processing at Step S215.

In the image-pickup apparatus 100 according to the embodiment operated as described above, in the macro-mode (close-range taking mode), the light emission amount from the tally light 58 is reduced. Furthermore, during picking up the static image, the tally light 58 is turned off. Thereby, when the distance between an object and the image-pickup apparatus 100 is small, the light from the light emission device and reflected by the object is prevented in advance from being transferred to the static image, in which the moving image is recorded, so as to provide the excellent static image to a picture taker.

According to the embodiment, a case is exemplified where the operation of the tally light 58 is suppressed even when the first shutter switch SW1 is turned ON and during the image-picking up preparation such as the exposure control and the focal point adjustment; however, the present invention is not limited to this, so that the operation of the tally light 58 may be suppressed only during the principal exposing for the static image picking up.

Other Exemplary Embodiments

Each feature constituting the image-pickup apparatus according to the embodiments of the present invention and each step in the control method of the image-pickup apparatus can be achieved by operating a program stored in an RAM and an ROM of a computer. This program and a memory medium storing the program and being readable with a computer incorporate the present invention.

The present invention can embody a system, an apparatus, a method, a program, or a memory medium. Specifically, a system composed of a plurality of instruments may incorporate the invention or a system composed of one instrument may incorporate the invention.

The present invention may also be achieved by supplying software programs achieving the functions of the embodiments described above (the programs corresponding to the flowcharts shown in FIGS. 2 to 6 according to the embodiments) to a system or an apparatus directly or remotely so that a computer of the system or the apparatus reads out the supplied program codes so as to be executed.

Accordingly, in order to achieve the functional processing of the invention by a computer, the program code itself to be installed in the computer achieves the present invention. That is, the computer program for achieving the functional processing of the invention incorporates the present invention.

In this case, the computer program may also be a program to be executed by an object code or an interpreter and script data for supplying to an OS as long as it has a program function.

The memory medium for supplying the program includes a Floppy™ disk, a hard disk, an optical disk, a magnetic optical disk, an MO, a CD-ROM, a CD-R, a CD-RW, a magnetic tape, a nonvolatile memory card, an ROM, and a DVD (DVD-ROM and DVD-R).

The program may also be supplied by connecting to a home page of the Internet using browser of a client computer so that the computer program of the invention itself or a file compressed and having an automatic installing function is down loaded from the home page into a memory medium such as a hard disk.

The present invention may also be achieved by dividing a program code constituting the program of the invention into a plurality of files so as to down load each file from a different home page. That is, a WWW server that is allowed to down load the program file for achieving the functional processing of the invention into a plurality of users also incorporates the present invention.

The present invention may also be achieved by encrypting the program of the invention so as to be distributed to users by storing it in a memory medium such as a CD-ROM so that key information for decoding the coded program is allowed to down load it to a user satisfying a predetermined condition from a home page via the Internet, and using the key information, the coded program is executed and installed in a computer.

In addition to the achieving the functions of the embodiments by allowing a computer to execute the read out program, the functions of the embodiments may also be achieved by allowing an OS operating on the computer to execute the practical entire processing or part thereof on the basis of the instruction of the program.

Furthermore, the functions of the embodiments may also be achieved, after the program read out of the memory medium is written in a memory provided in a function expansion board inserted in a computer or a feature expansion unit connected to a computer, by allowing a CPU provided in the function expansion board or the feature expansion unit to execute the practical entire processing or part thereof on the basis of the instruction of the program.

While the present invention has been described with reference to exemplary embodiments, it is to be understood that the invention is not intended to be limited to the disclosed exemplary embodiments. The scope of the following claims is to be accorded the broadest interpretation so as to encompass all modifications, equivalent structures and functions.

This application claims the benefit of Japanese Application No. 2005-185476 filed Jun. 24, 2005, which is hereby incorporated by reference herein in its entirety.

What is claimed:

1. An image-pickup apparatus comprising:
   an imaging unit configured to obtain object images;
   a notification unit configured to perform notification that images are being obtained by the imaging unit, the notification being performed by light emission;
   a macro-mode setting unit configured to set the imaging unit in a macro mode; and
   a notification control unit configured to control the light emission of the notification unit in accordance with whether the macro mode is set or not by the macro-mode setting unit,
   wherein, when the macro mode is set in obtaining a still image by the imaging unit, the notification control unit prohibits the light emission, and
   wherein, when the macro mode is set in obtaining a moving image by the imaging unit, the notification control unit reduces luminance of the light emission.

2. The apparatus according to claim 1, further comprising a flash unit having a floodlight function, wherein the notification control unit controls the light emission by the notification unit separately from controlling the floodlight function.

3. The apparatus according to claim 1,
   wherein, when a static image is obtained by the imaging unit during obtaining the moving image in the macro mode, the notification control unit prohibits the light emission of the tally light, and wherein, after the static image is obtained, the notification control unit resumes the light emission of the tally light, the light emission of which was prohibited, with reduced luminance.

4. A control method for an image-pickup apparatus including an imaging unit configured to obtain object images, a notification unit configured to perform notification that images are being obtained by the imaging unit, the notification being performed by light emission, and a macro-mode setting unit configured to set the imaging unit in a macro mode, the method comprising:

determining whether the macro mode is set by the macro-mode setting unit;

controlling the light emission of the notification unit in accordance with a determined result, and prohibiting light emission when the macro mode is set by the macro-mode setting unit, wherein, when the macro mode is set in obtaining a still image by the imaging unit, the notification control unit prohibits the light emission, and wherein, when the macro mode is set in obtaining a moving image by the imaging unit, the notification control unit reduces luminance of the light emission.

5. A computer readable memory medium containing computer-executable instructions for executing a control method for an image-pickup apparatus including an imaging unit configured to obtain object images, an notification unit configured to perform notification that images are being obtained by the imaging unit, the notification being performed by light emission, and a macro-mode setting unit configured to set the imaging unit in a macro mode, the medium comprising:

computer-executable instructions for determining whether the macro mode is set by the macro-mode setting unit;

computer-executable instructions for controlling the light emission of the notification unit in accordance with the determined result, and computer-executable instructions for prohibiting light emission when the macro mode is set by the macro-mode setting unit in obtaining a still image by the imaging unit; and computer-executable instructions for reducing luminance of the light emission when the macro mode is set by the macro-setting unit in obtaining a moving image by the imaging unit.

* * * * *